United States Patent [19]

Schrader

[11] Patent Number: 5,114,118
[45] Date of Patent: May 19, 1992

[54] VERTICAL LIFT DOLLY

[76] Inventor: V. E. (Bud) Schrader, 12519 Elm Manor, San Antonio, Tex. 78230

[21] Appl. No.: 668,876

[22] Filed: Mar. 13, 1991

[51] Int. Cl.⁵ ............................................. B60P 1/48
[52] U.S. Cl. .................................... 254/8 R; 254/3 R; 254/8 C
[58] Field of Search ............ 254/8 R, 8 B, 8 C, 2 R, 254/2 B, 2 C, 3 R, 3 C, 124

[56] References Cited

U.S. PATENT DOCUMENTS

| | | | |
|---|---|---|---|
| 1,410,862 | 3/1922 | Wollbrandt | 254/8 C |
| 1,956,245 | 4/1934 | Moorman et al. | 280/44 |
| 2,319,581 | 5/1943 | Browlee et al. | 280/44 |
| 2,628,068 | 2/1953 | Sehnert | 280/44 |
| 2,762,631 | 9/1956 | Entz | 254/10 |
| 2,937,850 | 5/1960 | Winkler et al. | 254/8 R |
| 4,592,536 | 6/1986 | Jasinski | 254/8 R |

Primary Examiner—J. J. Hartman
Attorney, Agent, or Firm—Gunn, Lee & Miller

[57] ABSTRACT

A hand operated, vertical lift dolly upon which objects may be placed and vertically lifted or lowered using the mechanical motion of a load handle. A load table is controlled by the load handle, and can be locked in place once it has been raised to a transport configuration. The load table remains in a substantially horizontal orientation throughout the loading and lifting process. The dolly can be moved from one location to another for loading and unloading objects, this motion facilitated by a wheeled carriage. The vertical lift dolly can, by appropriate positioning of the handle and load table, be placed in a space saving storage configuration.

6 Claims, 4 Drawing Sheets

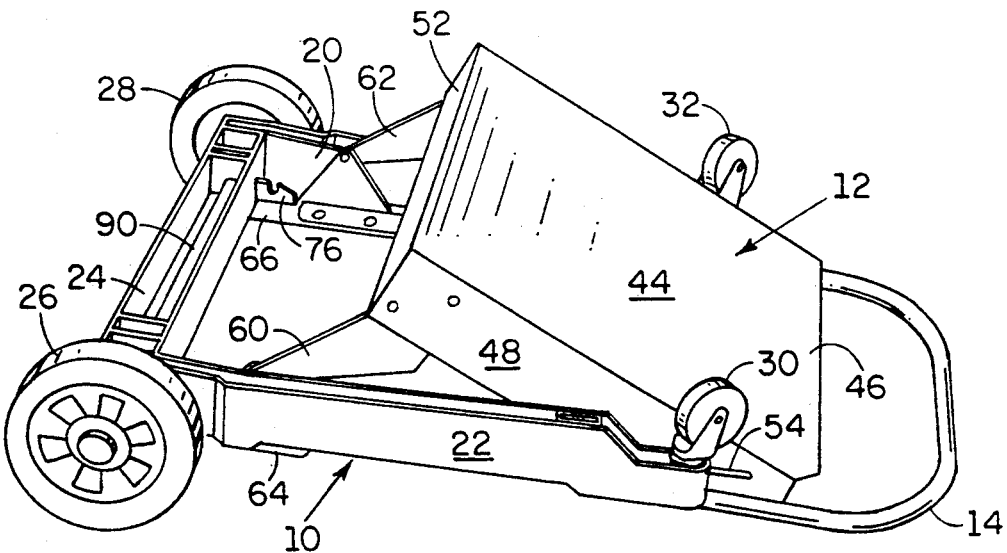
FIG. 3 (VIEW FROM BOTTOM)
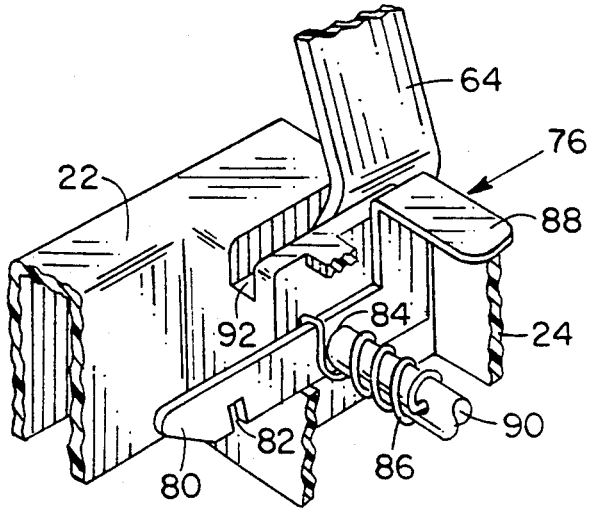
FIG. 4
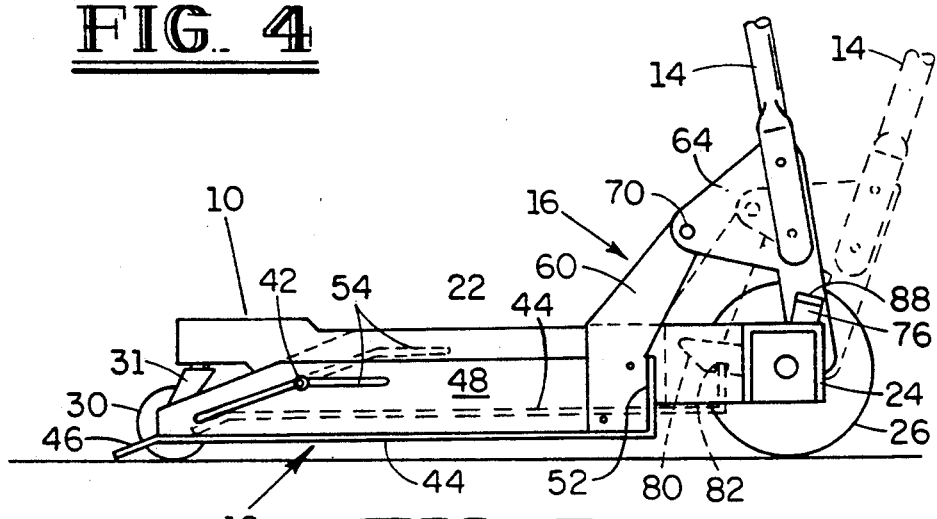
FIG. 5

VERTICAL LIFT DOLLY

I. BACKGROUND OF THE INVENTION

1. Field of the Invention

The present invention relates generally to dollies, hand trucks, and other devices designed to aid in the lifting and transport of small loads. The present invention relates more specifically to dollies, hand trucks, and other such devices that are capable of vertically elevating a load prior to its being transported.

2. Description of Related Art

The transport of small to medium sized loads from one place to another within a localized area has heretofore generally been accomplished by means of simple two wheeled vehicles referred to as dollies or hand trucks. Larger loads which require transportation within similar confines more frequently are handled on pallets by pallet moving equipment, either hand operated or motor driven. Hand trucks and dollies are utilized in preference to such devices designed for larger loads because of their smaller size and their resultant maneuverability and control.

Specialized hand trucks and dollies have been developed for specific applications for everything from transporting large barrels to moving household appliances. Most dollies and hand trucks, however, share the same basic functional characteristics Dollies are generally two wheeled, have a lifting plate or platform, and provide a handle/leverage means for lifting and controlling the load. An important functional feature of most dollies and hand trucks is their capacity to place their load platform under a load, in its position on the ground or floor, and then lift the load so that it is no longer in contact with the ground, but is supported by the frame of the dolly or hand truck. The load is then transportable across the ground or floor surface by use of the wheels on the vehicle frame.

The simplest means for achieving this most basic function of lifting a load in an efficient manner is through the use of a lever mechanism that uses the wheel axle as a fulcrum point. A lever mechanism, therefore, allows the mover to multiply the force of his lifting effort by way of a rotational torque about the fulcrum point of the lever. The typical dolly or hand truck utilizes a relatively short lift platform and a relatively long handle assembly so as to impart the necessary force multiplying factor to the mover's efforts.

The problems, however, with this simple means of achieving a combination of wheeled transport and force multiplying lever function, are numerous. The first and most obvious problem is the instability of the load and the moving device, once the load has been lifted for transport. In most hand trucks, there is no stable transport position that does not rely upon the constant control and effort of the individual doing the moving. This instability is a result of combining the fulcrum point of the lever mechanism with the axle point of the wheel assembly. While this makes for a simple overall mechanism, it means that the operator is tied to control of the hand truck when it is in a transport configuration.

A second, but no less troublesome, problem becomes apparent with loads that do not lend themselves to be tilted during loading or transport. Integral with the above described combined function of the lever means and the wheel assembly, is the necessity that the load be rotated to some extent about the fulcrum point of the lever. Since the load platform is typically in a fixed relationship with the handle/lever means, it will necessarily be disturbed from its initial horizontal position upon loading, to an angled positioned upon transport. This angled position could be anywhere from a few degrees from the horizontal to a nearly vertical position, depending upon the capability of the mover to control the lever arm. In any case, there are many types of loads that can not be subjected to this rotational displacement, either because of an internal instability or because of an external instability that results from the stacking of a number of individual loads. Whatever the reason, there are many items, both in industrial applications and in household situations, that can not or should not be tilted during transport.

There have been some efforts to attempt a stable and efficient means of transport for such objects. Some of these efforts have focussed on the size and/or weight of the object being moved and the inability of the mover to constantly support the load, even with a lever arrangement, during transport. Some of these efforts have focussed on the capacity to raise and transport the load without tilting. Most of these efforts suffer from problems of complexity, size, and the resultant costs that complexity and size demand. Those that attempt to remain simple and less costly, tend to suffer from a lack of structural integrity.

There is a need, therefore, for a simple yet effective means for transporting small to medium sized loads, in both industrial and household situations, that provides both transport stability and the capacity to lift the loads without rotationally displacing them from their ordinary stance. Examples of loads that might benefit from such a device include large plants, office supplies, books, barrels, and industrial supplies, to name a few.

II. SUMMARY OF THE INVENTION

It is therefore an object of the present invention to provide a hand operated dolly capable of vertically lifting a load from a floor surface prior to its transportation.

It is a further object of the present invention to provide a dolly capable of vertically lifting a load prior to its transportation, in a manner that allows the transport of the load without tilting or otherwise disturbing the orientation of the load.

It is a further object of the present invention to provide a dolly capable of vertically lifting a load without disturbing the vertical orientation of the load, without the exertion of a great force, and by way of a leverage means.

It is a further object of the present invention to provide a dolly capable of vertically lifting a load prior to its transport, wherein the load may be moved across a horizontal surface without subjecting the load to precarious instability.

It is a further object of the present invention to provide a dolly capable of vertically lifting a load prior to transporting it across a horizontal surface wherein the load, once lifted, may be maintained in this lifted position without further attention from an operator of the dolly.

It is a further object of the present invention to provide a dolly capable of vertically lifting a load and transporting it across a horizontal surface without the necessity of the operator of the dolly exerting force to maintain the vertical position of the load.

In fulfillment of these and other objectives, the present invention provides a hand operated vertical lift dolly, wherein objects may be placed on a load table and vertically lifted or lowered using a mechanical motion of a load handle or load lifting bar. The load table and load handle can be locked in place once the load table has been raised. The load table remains in a substantially horizontal orientation throughout the loading and lifting process. A wheeled carriage, which forms the structural frame work of the vertical lift dolly, facilitates the movement of the dolly from one location to another for loading and unloading. The vertical lift dolly of the present invention can, by appropriate positioning of the handle and load table, be placed in a space saving storage configuration. Other objects and goals of the present invention will become apparent from the below described embodiments, and from the appended claims.

III. BRIEF DESCRIPTION OF THE DRAWING

FIG. 3 is a perspective view of a preferred embodiment of the present invention in a storage configuration.

FIG. 4 is a detailed view of the retaining clip means of the preferred embodiment of the present invention shown in FIG. 1.

FIG. 5 is a partial cross sectional view of the right side of a preferred embodiment of the present invention showing details of the transition between a transport configuration and a load/unload configuration.

Figures 7, 8:
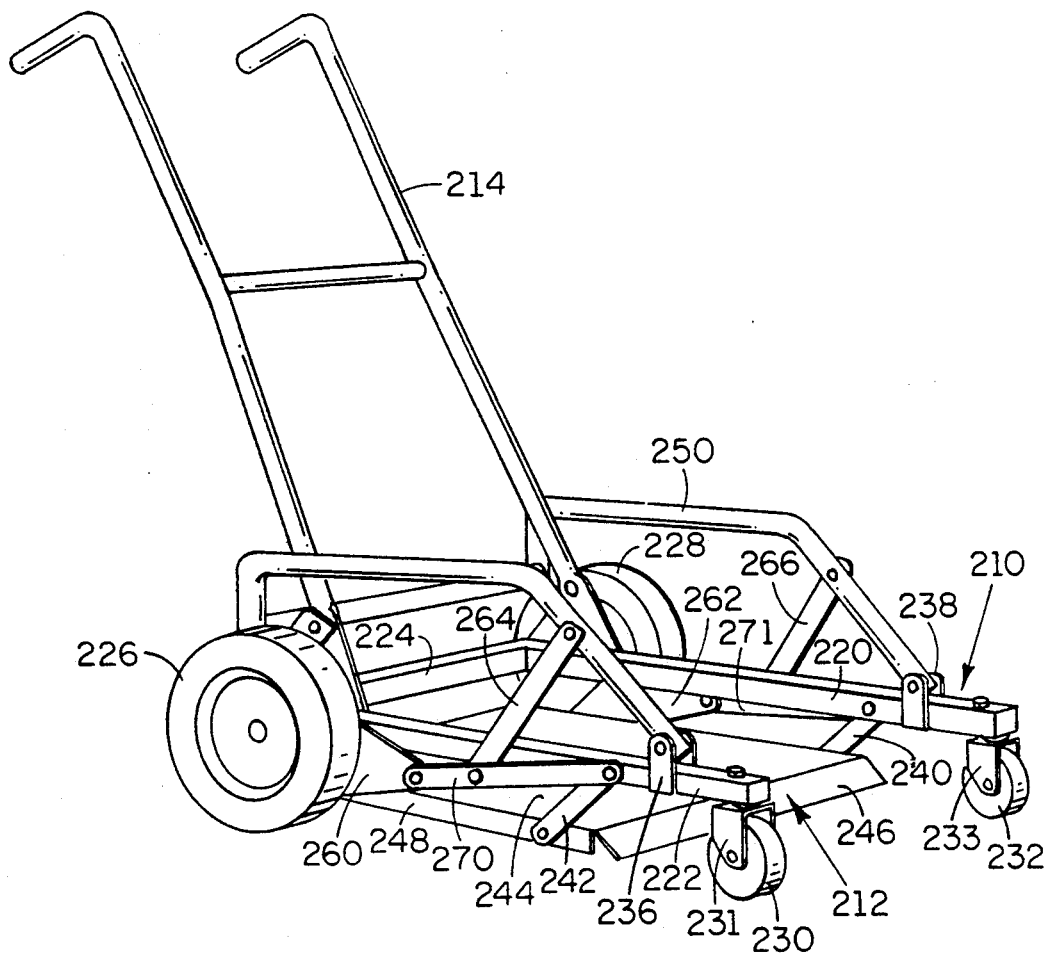
FIG. 7 is a second alternative preferred embodiment of the present invention in a load/unload configuration.

FIG. 8 a detailed side view of the second alternative preferred embodiment of the present invention shown in FIG. 7.

IV. DETAILED DESCRIPTION OF A PREFERRED EMBODIMENT

Figure 1:
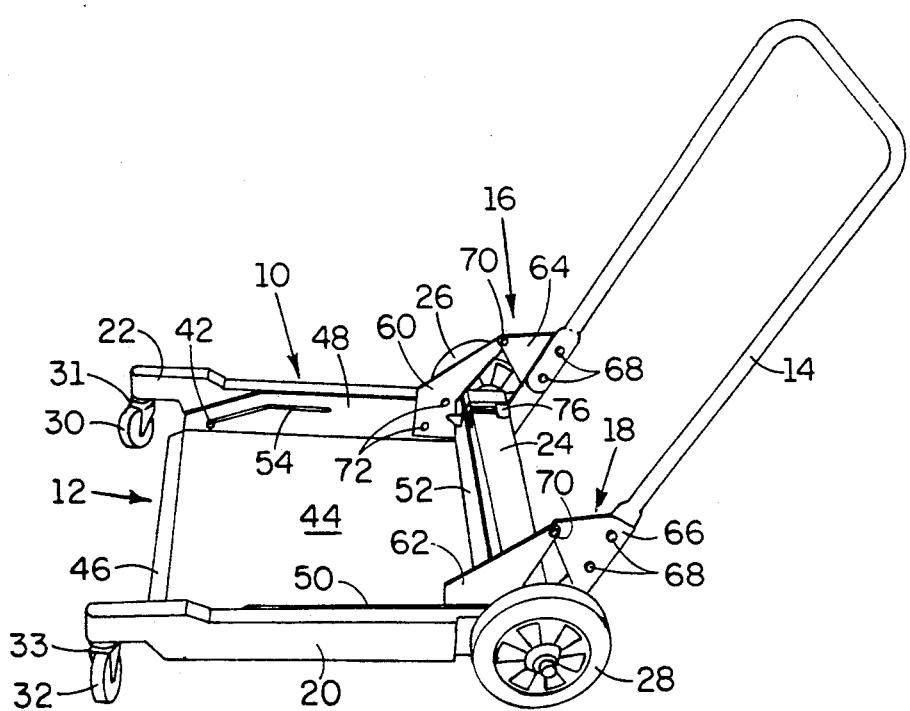
FIG. 1 is a perspective view of a preferred embodiment of the present invention in a transport configuration.

Reference is first made to FIG. 1 for a detailed description of a preferred embodiment of the present invention, in a transport configuration. The vertical lift dolly in this preferred embodiment is comprised of four primary elements or assemblies. Wheeled carriage 10 provides a frame to which are attached load table 12, handle assembly 14, and lift hinge assemblies 16 and 18. Wheeled carriage 10 provides the structural frame, and therefore the structural support for the vertical lifting action of the dolly and its horizontal transport action. Load table provides the surface upon which the load to be moved may be placed and carried during transport, and is itself slidingly attached to wheeled carriage 10 by means described in more detail below, which means allow it to move from a lowered position in contact with the floor or ground surface, to a raised position that removes the load from contact with the ground surface, and places it in a condition that allows the load to be transported. Handle 14 serves two functions, first to provide a lever arm by which the load may be efficiently lifted from the floor surface, and second, to provide a means whereby the vertical lift dolly may be controlled in its transportation once the load has been lifted onto load table 12. Lift hinge assemblies 16 and 18 provide the means whereby load handle 14 is pivotally attached to load table 12 and achieves the lifting function necessary to move load table 12 from a load/unload configuration to a transport configuration. Each of these four primary elements work together to provide not only the capacity of the vertical lift dolly to efficiently lift a load from the ground without changing its rotational stance, but to transport the load, once lifted, without the necessity of the operator providing a constant lifting force to the load.

Wheeled carriage 10 may be generally described as a "U" shaped frame made up of three primary components. Left side carriage arm 20 is aligned parallel to right side carriage arm 22, and is connected to right side carriage arm 22 by way of carriage crossmember 24. The material from which these wheeled carriage components are made is dependent to some extent upon the application to which the vertical lift dolly is intended. For household usage, these wheeled carriage components may be constructed of properly reinforced rigid plastic material capable of standing up to small to medium household loads. In heavier industrial applications, these wheeled carriage members may more preferably be constructed of steel or extruded metal components that are capable of standing up to much heavier loads. It would also be appropriate to construct these carriage members of fiber glass, or other rigid composite materials that can provide light weight and easy maneuverability of the vertical lift dolly, while at the same time, providing the structural integrity needed for the particular application.

In the preferred embodiment, wheeled carriage 10 is supported at its four corners by four independently functioning wheels. Right side rear wheel 26 and left side rear wheel 28 are attached to wheeled carriage 10 at the junctions between left side carriage arm 20 and carriage crossmember 24 and right side carriage arm 22, and carriage crossmember 24. Appropriate axle means, not shown in FIG. 1 are positioned integral to carriage crossmember 24 so as to stably attach left and right side rear wheels 26 and 28 to wheeled carriage 10. Positioned forward, at an open end of the "U" shaped wheeled carriage 10, are right and left side front wheels 30 and 32. In the preferred embodiment, right and left side front wheels 30 and 32 are attached to pivoting casters 31 and 33, which are in turn attached respectively to right and left side carriage arms 20 and 22. This pivoting capacity of right and left side front wheels 30 and 32 allows for the easier transport of the load once lifted. Were right and left side front wheels 30 and 32 rigidly aligned with right and left side rear wheels 26 and 28, the turning of the vertical lift dolly during transport would be made more difficult. Together, the three components of wheeled carriage 10 in conjunction with the four wheels 26, 28, 30, and 32, form a stable "U" shaped carriage design that surrounds load table 12, and thus the load placed upon it.

Load table 12 is a platform of generally rectangular configuration designed to fit within the confines of wheeled carriage 10, and to appropriately support and contain the load to be lifted by the vertical lift dolly. Load table 12 is a horizontal platform made up primarily of load table tray 44, and has confining sides along three of its edges shown as load table right side 48, load table left side 50, and load table back 52. Projecting from an open edge of load table tray 44 is load table lip 46, which is merely an extension of load table tray 44 that is angled downward so as to engage the ground or floor surface, and to more easily allow for the positioning of the load onto load table tray 44 as described in more detail below. Load table sides 48 and 50 serve not only to confine the load to load table 12 and prevent it from being engaged or obstructed by wheeled carriage 10, but also serve to slidingly connect load table 12 to wheeled carriage 10. Load table back 52 likewise serves to confine the load to load table tray 44, but also serves an important retaining feature once the load has been lifted, which retaining feature is described in more detail below.

Load table 12 is slidingly attached to wheeled carriage 10 10 at two points near the forward, open end of wheeled carriage 10. Positioned near the forward end of left side carriage arm 20 is left side load support pin (not shown). Positioned near the forward end of right side carriage arm 22 is right side Right side load support pin 42 and left side load support pin (not shown) extend partially into carriage arms 20 and 22 respectively and through guide slots 54 in load table right side 48 and load table left side 50. (Guide slots 54 and load table left side 50 not shown in FIG. 1.) Load support pins 40 and 42 are designed to both appropriately fit within guide slots 54 and retain load table right and left sides 48 and 50 in near proximity to left and right side carriage arms 20 and 22. Guide slots 54 are configured so as to allow load table 12 to be stably positioned in either a lowered configuration in contact with the ground or floor surface, or in an elevated configuration raised above the ground or floor surface. The specific structure of guide slots 54 is discussed in more detail below with regard to the function of the vertical lift dolly in both the loading-/unloading position and the transport position. Other than though load support pins 40 and 42, load table 12 is not connected to wheeled carriage 10, except through lift hinge assemblies 16 and 18, by way of handle 14. The actual downward force exerted by the load is, therefore, supported by wheeled carriage 10 through left and right side load support pins 40 and 42, and through the force transferred to the carriage by way of lift hinge assemblies 16 and 18.

Load table 12 is supported on its rearward end adjacent to carriage crossmember 24 by way of right and left side lift hinge assemblies 16 and 18. Right side lift hinge assembly 16 is comprised primarily of right side load table lifter 60 and right side handle lifter 64. Right side load table lifter 60 is attached to load table right side 48 by way of load table attachment bolts 72. In this preferred embodiment, right side load table lifter 60 is a plate which extends from load table right side 48 upward to a position where it is connected with right side handle lifter 64. The connection between right side load table lifter 60 and right side handle lifter 64 is a pivotal hinge connection maintained by lifter hinge pin 70. This arrangement allows right side load table lifter 60 and right side handle lifter 64 to rotate in a plane approximately common to the planes of their plate structures. Left side lift hinge assembly 18 is constructed in much the same manner as right side lift hinge assembly 16. Left side lift hinge assembly 18 is comprised primarily of left side load table lifter 62 and left side handle lifter 66. Left side load table lifter 62 is attached to load table left side 50 by way of load table attachment bolts 72 (not shown in FIG. 1) Left side load table lifter 62 is pivotally attached to left side handle lifter 66 by way of lifter hinge pin 70. Right and left side handle lifters 64 and 66 are themselves pivotally attached to carriage crossmember 24 at a position proximate to the axle (not shown) of right side rear wheel 26 and left side rear wheel 28. This connection provides the point at which the load forces are placed upon wheeled carriage 10, and are thus supported by the vertical lift dolly as a whole. The force of the load is, therefore, transferred from load table to right and left side lift hinge assemblies 16 and 18 downward onto carriage crossmember 24, and from there onto rear wheels 26 and 28.

The relative positions of the components of lift hinge assemblies 16 and 18 are controlled by the position of handle 14. Handle 14 is attached to each of lift hinge assemblies 16 and 18 by way of attachment to right and left side handle lifters 64 and 66. Handle 14 in the preferred embodiment is made of a shaped section of tubular steel. Handle 14 implements a change in the rotational orientation of right and left side handle lifters 64 and 66 with respect to carriage crossmember 24 and, therefore, wheeled carriage 10. This change in rotational orientation is converted into a vertical and horizontal movement of right and left side load table lifters 60 and 62 and, therefore, in a vertical and horizontal movement of load table 12 itself. The exact function of lift hinge assembly 16 and 18 in relation to this horizontal and vertical movement of load table 12 is described in more detail below with regard to the functional steps utilized in operating the vertical lift dolly.

A final component integral to wheeled carriage 10, describe generally in FIG. 1, is load table retaining clip 76. Load table retaining clip 76 is integrally attached to carriage crossmember 24 of wheeled carriage 10. Load table retaining clip 76 is configured to receive and confine load table back 52 in a position appropriate for transport. Load table back 52 contains load table retaining clip slot 78, which engages load table retaining clip 76 when load table 12 is drawn into an upward and rearward position. Load table retaining clip slot 78 initially displaces load table retaining clip 76 upward and then allows retaining clip 76 to drop into clip slot 78 in a manner that prevents load table 12 from moving forward or downward until retaining clip 76 is again rotated or displaced and retaining clip 76 is removed from clip slot 78. This arrangement maintains load table 12 in a raised position wherein load table 12 is drawn into and surrounded on three sides by wheeled carriage 10. The means whereby load table retaining clip 76 engages and releases load table 12 is described in more detail below.

Figure 2:
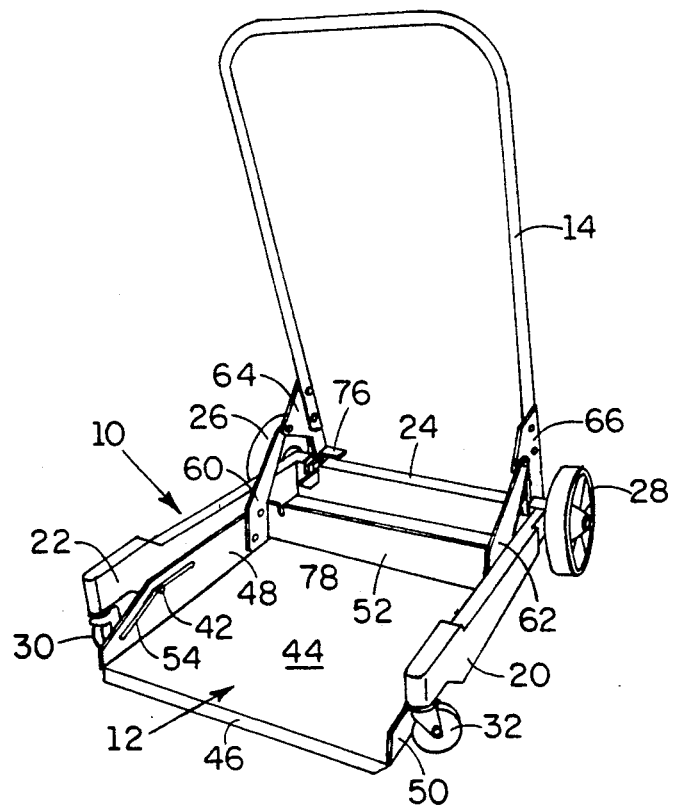
FIG. 2 is a perspective view of a preferred embodiment of the present invention in a load/unload configuration.

Reference is now made to FIG. 2 for a description of the preferred embodiment of the present invention shown in FIG. 1, now in a load/unload configuration. No additional components are disclosed in this figure, but the relative positions of the components described previously with regard to FIG. 1 are different.

Specifically, handle 14 has been moved from a position tilted to the rear of the vertical lift dolly to a position tilted forward and over wheeled carriage 10. This results in a rotational displacement of right and left side handle lifters 64 and 66. This rotational displacement of handle lifters 64 and 66 results in a horizontal and vertical displacement of right and left side load table lifters 60 and 62. This correspondingly results in a horizontal and vertical displacement of load table 12. This horizontal and vertical displacement is controlled to some extent by the structural configuration of guide slots 54 in load table right side 48 and load table left side 50.

In the load/unload configuration described in FIG. 2, load table 12 is seen to extend forward of and below wheeled carriage 10 to a position in contact with the ground or floor surface. This places load table 12 in the same level and adjacent to right and left front wheels 30 and 32. This load/unload position also opens a gap between load table back 52 and carriage crossmember 24. Whereas previously in the transport position, load table back had been in near contact with carriage crossmember 24, the horizontal movement of load table 12 displaces load table 12 out from the "U" shaped confines of wheeled carriage 10, and extends load table 12 to a position generally forward of its previous position.

Further discussion describing the differences between the configuration shown in FIG. 1 and FIG. 2 is made below with regard to the functional steps required for the lifting and transporting of the load with the vertical lift dolly.

Reference is now made to FIG. 3 for a detailed description of the preferred embodiment of the present invention shown in FIG. 1, now in its storage configuration. The vertical lift dolly of the present invention is capable not only of changing its configuration from a load/unload configuration to a transport configuration, but is also capable of being configured for the purpose of storage when the device is not in use. The goals of the storage position are to reduce the volume taken up by the vertical lift dolly by pivoting handle 14 into a plane substantially co-planer with load table 12 and wheeled carriage 10. This is achieved by positioning the various components of the vertical lift dolly in relative alignment as shown in FIG. 3. If handle 14 is rotated past the point shown in FIG. 2 for a load/unload position, in a manner that further reduces the angle between handle 14 and wheeled carriage 10, load table 12 is forced to extend further below wheeled carriage 10, and further out from its "U" shaped confines. This continued rotation results in the displacement of load table 12 below a position appropriate for the loading and unloading of material thereon, and allows handle 14 to fold to a position essentially co-planer with wheeled carriage 10. FIG. 3 shows this collapsed configuration from the bottom after handle 14 has rotated completely around to come into contact with, and to be approximately co-planer with wheeled carriage 10. In this storage position, rear axle 90 which supports and retains rear wheels 26 and 28 can be seen in its position within carriage crossmember 24. Otherwise, all components disclosed in FIG. 3 are the same as those shown in FIGS. 1 and 2. In the configuration shown in FIG. 3, the vertical lift dolly may be stored, or may itself be transported upon rear wheels 26 and 28 in a somewhat simpler configuration than that shown in FIG. 1 or in FIG. 2.

Reference is now made to FIG. 4 for a detailed view of load table retaining clip 76 and the means whereby it engages and retains load table 12 in a transport configuration. FIG. 4 is a partial cutaway view into carriage crossmember 24 showing the means whereby load table retaining clip 76 is positioned to either release or retain load table 12. Load table retaining clip 76 is comprised of retaining clip deflector 80, retaining clip slot 82, retaining clip pivot 84, and retaining clip foot pad 88. Retaining clip deflector 80, in the preferred embodiment, is merely an angled edge on the forward end of load table retaining clip 76. Behind retaining clip deflector 80 is retaining clip slot 82, which is appropriately configured to engage load table retaining clip slot 78.

Retaining clip pivot 84 is a fulcrum point for retaining clip 76, and a rotational pivot point that allows retaining clip slot 82 to be lifted in and out of engagement with load table retaining clip slot 78. This rotation is achieved by the depression of retaining clip foot pad 88, which causes retaining clip 76 to rotate and retaining clip slot 82 to lift out of engagement with load table retaining clip slot 78. Load table retaining clip 76 is generally held in a downward engagement with load table retaining clip slot 78 by way of retaining clip spring 76. Retaining clip spring 86 engages either stationary rear axle 90 (as shown) or stationary carriage crossmember 24 (not shown), and also engages rotational load table retaining clip 76. The spring force provided by retaining clip spring 86 counters the rotation brought about the depression of retaining clip foot pad 88, and normally rotates load table retaining clip 76 as far as it is allowed to travel by the confines of carriage crossmember 24 which surrounds it.

Reference is now made to FIG. 5 for a more thorough description of the means whereby the vertical lift dolly changes from a load/unload configuration into a transport configuration, thereby lifting the load from the ground or floor surface, and positioning it in a stable position for transport. FIG. 5 describes the relative positions of the various components of a preferred embodiment of the present invention as seen in a cutaway view from a position on load table 12 looking across to the various components of the right side of wheeled carriage 10. FIG. 5 shows these components in both an unload/load position, with solid lines, and a transport configuration, shown with shadow lines.

In the load/unload configuration, load table 12 is shown lowered with respect to wheeled carriage 10, and with load table lip 46 in contact with the floor or ground surface. The vertical position of load table 12, with respect to wheeled carriage 10, is restricted and controlled by the configuration of guide slot 54. As shown in FIG. 5, the upper and rear most end of guide slots 54 are horizontal slots whose height above the ground or floor surface is appropriate for load table lip 46 to just contact such ground or floor surface. Any further movement of load table would result in merely the horizontal displacement of load table 12 out of the confines of "U" shaped wheeled carriage 10.

In this load/unload configuration, handle 14 is shown in its forward position extending slightly over wheeled carriage 10. Handle lifter 64 is shown rotated forward along with handle 14 in a position that forces load table lifter 60 in a downward and forward configuration, which configuration is likewise transferred to load table 12. In this configuration, load table lip 46 not only contacts the ground or floor surface, but extends forward of right and left side front wheels 30 and 32.

In the transport configuration, shown by the shadow lines in FIG. 5, load table is pulled up and into wheeled carriage 10 by way of the backwards rotation of handle 14, and the corresponding rotation of right and left side handle lifters 64 and 66. The rotation back of handle lifters 64 and 66 lifts up and back on load table lifters 60 and 62, which lift up and back on load table 12. Guide slots 54 thereafter engage load support pins 40 and 42 in their lower and forward portions. The lower forward portion of each guide slot 54 is at an angle that follows the lifting action of load table lifters 60 and 62, both in the horizontal plane and in the vertical plane. Therefore, the motion of a point on load table 12 under the control of load table lifters 60 and 62, follows the motion of a similar point on the forward end of load table 12, which is controlled by guide slots 54. In a complete upright and loaded position, load support pins 40 and 42 reside at the forward most lower end of guide slots 54. Load table 12 is held in this raised and loaded position by load table retaining clip 76. The rotation of handle 14 backwards, which pulls load table 12 backwards and upwards, forces load table back wall 52 to engage, and be retained by, load table retaining clip 76. Load table retaining clip slot 78 first engages retaining clip deflector 80, which forces retaining clip 76 upward, so as to allow the more complete engagement between load table retaining clip slot 78 and retaining clip slot 82. Retaining clip spring 86, not shown in FIG. 5, forces load table retaining clip 76 in a downward direction to maintain this engagement, which in turn retains load table 12 in a lifted and rearward position.

The use of the vertical lift dolly of the preferred embodiment described hereinabove, is accomplished as follows. Starting with the vertical lift dolly in a transport configuration with no load upon load table 12, the operator of the dolly handles and controls the dolly by way of handle 14. Manipulation of handle 14 requires no continuous upward or downward force on the handle, but rather requires only the horizontal force necessary to push the dolly along a floor or ground surface, and to turn the dolly to reorient its opening. The turning of the dolly itself is facilitated by pivoting casters 31 and 33, which retain front wheels 30 and 32. Turning is also facilitated by the independent rotation of rear wheels 26 and 28.

The vertical lift dolly of the present invention is brought adjacent to a load to be lifted in its transport position Once adjacent to the load, the vertical lift dolly is moved from its transport configuration to its load/unload configuration. This transition is achieved by the operator placing his foot upon retaining clip foot pad 88, shown most clearly in FIG. 4, which causes load table retaining clip 76 to rotate against the force of retaining clip spring 86, and to disengage load table retaining clip slot 78 from retaining clip slot 82. This disengagement releases load table back wall 52, and allows load table 12 to move downward and forward out of wheeled carriage 10, when it is so directed. The movement of load table 12 is controlled by the position of handle 14. Handle 14 in its transport position is rotated back above and behind wheeled carriage 10 in a manner that draws load table 12 up and into wheeled carriage 10. Once load table 12 has been released by retaining clip 76, handle 14 is free to rotate forward above wheeled carriage 10 so as to force load table 12 forward and downward, from wheeled carriage 10. This motion, as described above, is controlled by lift hinge assemblies 16 and 18 whose shape and relative positions determine how the rotation of handle 14, about a pivot point on carriage crossmember 24, translates into the horizontal and vertical displacement of load table 12. This horizontal and vertical displacement would not be controlled if it were not for a corresponding horizontal and vertical displacement guide provided by guide slots 54. As handle 14 is rotated forward and load table 12 is encouraged to itself go forward and down, guide slots 54 control the movement of load table 12, both with regard to the extent that it is allowed to drop vertically, and with regard to the angle that it maintains as this vertical drop is achieved. The path of vertical and horizontal displacement that is encouraged by lift hinge assemblies 16 and 18 upon the rotation handle 14 is followed closely by the angle of guide slots 54, and their engagement of left and right side support pins 40 and 42. This similarity of motion and guidance allows for the forward and downward repositioning of load table 12 without a change in the orientation of load table tray 44 from the horizontal. This is important not so much at this first step of positioning load table 12 to begin loading the cargo, but at the subsequent steps of pulling the load up onto the vertical lift dolly and transporting it across the ground or floor surface.

Once in the position shown in FIG. 5 where load table 12 is in contact with the ground or floor surface adjacent to the load to be lifted, the operator may place his foot upon carriage crossmember 24 so as to place the vertical lift dolly itself in a fixed position on the ground or floor surface. Once in this position, handle 14 may then be rotated further forward above wheeled carriage 10 so as to further force load table in a forward direction. At this point in the rotational arc of lift hinge assemblies 16 and 18, the motion that results from a rotation of handle 14 about carriage crossmember 24 is primarily in the horizontal direction. Very little vertical movement results from a continued rotation at this point. This primarily horizontal motion is patterned by the configuration of guide slot 54. Thus, when handle 14 is rotated forward past the point at which load table 12 first contacts the ground or floor surface, the motion of load table 12 is primarily in a forward direction so as to attempt to slide under the load to be lifted. It is not anticipated that this motion alone will completely force the load onto load table 12, but this action provides the initial lift from which the balance of the load may be slid forward onto load table 12 for lifting.

Once the load is positioned and centered on load table 12, the transition may be made from the load/unload configuration back to the transport configuration. This is achieved by rotating handle 14 back behind wheeled carriage 10 which, again according to the structural configuration of lift hinge assemblies 16 and 18, pulls upward and backwards on load table 12 so as to pull load table 12, and the load upon it, up into wheeled carriage 10. This lifting motion is facilitated by the operator placing his foot again upon carriage crossmember 24 so as to stabilize the horizontal position of the vertical lift dolly on the ground or floor surface. Once stable, a pulling force backwards on handle 14 causes the load table lifter portions 60 and 62 of lift hinge assemblies 16 and 18 to follow a broad arc approximated by the slope of the lower forward portions of guide slots 54. Thus, the forward and rear ends of load table 12 follow this angled movement up into a position surrounded by wheeled carriage 10. At a point near where the load has been completely lifted, load table retaining clip slot 78 engages retaining clip deflector 80 of load table retaining clip 76, and forces retaining clip 76 upward until such point as load table retaining clip slot 78 engages retaining clip slot 82. Once slots 78 and 82 engage, load table retaining clip 76 is forced by retaining clip spring 86 to rotate forward again in a manner that prevents the disengagement of slots 78 and 82. Thus, though the load itself tends to force load table 12 in a downward position, which in turn tends to rotate handle 14 forward and into the load/unload configuration, retaining clip 76 prevents this transition and this movement until such time as the operator depresses retaining clip foot pad 88 and releases retaining clip 76. The load is now in a configuration appropriate for its transport across the ground or floor surface.

In the transport configuration, there are a number of features of the preferred embodiment which facilitate the efficient movement of the load from one place to another. Not only is the load stably supported at four points by wheels 26, 28, 30, and 32 of wheeled carriage 10, but the load is maintained substantially horizontal and parallel to a plane defined by the ground surface and defined by wheeled carriage 10. This constant horizontal orientation is maintained despite the upward and rearward movement of load table 12 that occurs during the loading process. Throughout the entire loading (and unloading) process load table tray 44 is maintained in a substantially horizontal position.

Because retaining clip 76 is positioned so as to work against the tendency of the load to force handle 14 forward into a load/unload position, no effort is required by the operator to retain handle in its full, upright, and rearward configuration. The only force necessary by the operator of the vertical lift dolly is, therefore, such horizontal force as is necessary to push the dolly and the load across the ground or floor surface. Once again, the handling of the vertical lift dolly with the load in place is facilitated by pivoting casters 31 and 33, which retain left right front wheels 30 and 32.

Once at the destination location for the load, the process of releasing retaining clip 76 is essentially the same as described above prior to the step of loading the cargo initially. Load table retaining clip 76, and in particular retaining clip foot pad 88, is positioned so that the operator may simultaneously depress retaining clip foot pad 88, and hold his foot to the rear of carriage crossmember 24. This position facilitates the gradual lowering of load table 12 upon the release of retaining clip 76, and the gradual movement of handle 14 which has a tendency to move forward under the forced load of cargo. Thus, with one foot behind carriage crossmember 24, the operator may release retaining clip 76, and gradually let handle 14 move forward under the influence of the load to its load/unload configuration as is shown in FIG. 2. Removal of the load from load table 12 is then the reverse of the loading process as load table tray 44 is slid out from underneath the load while it is in contact with the ground or floor surface.

IV. DETAILED DESCRIPTION OF A SECOND AND A THIRD ALTERNATIVE EMBODIMENT

It will be understood by those skilled in the art that the preferred embodiment described above is a single specific method of achieving the objects of the present invention. There are a number of possible lever arrangements and configurations that will achieve the lifting of a load platform into a transport carriage, while maintaining a substantially horizontal orientation of the load platform. It is possible to replace the single lever/handle structure of the above described embodiment with a multiple lever/handle structure that achieves the same horizontal and vertical lift. It is also possible to replace forward guide slots 54 with appropriately configured pivoting hangers, which allow for load table 12 to maintain a substantially horizontal orientation, and at the same time, move the load table or allowing the load table to move through the horizontal and vertical motions determined by the rotation of handle 14.

It is also possible to facilitate the motion of handle 14, with respect to wheel carriage 10, by adding a second handle substantially parallel to handle 14 in the transport configuration, which remains positioned as such in the load/unload configuration when handle 14 rotates forward and above wheeled carriage 10. The operator may then, in addition to placing his foot on carriage crossmember 24, hold the second handle in a stationary position while pulling back on handle 14 to again place handle 14 adjacent to the stationary handle.

Figure 6:
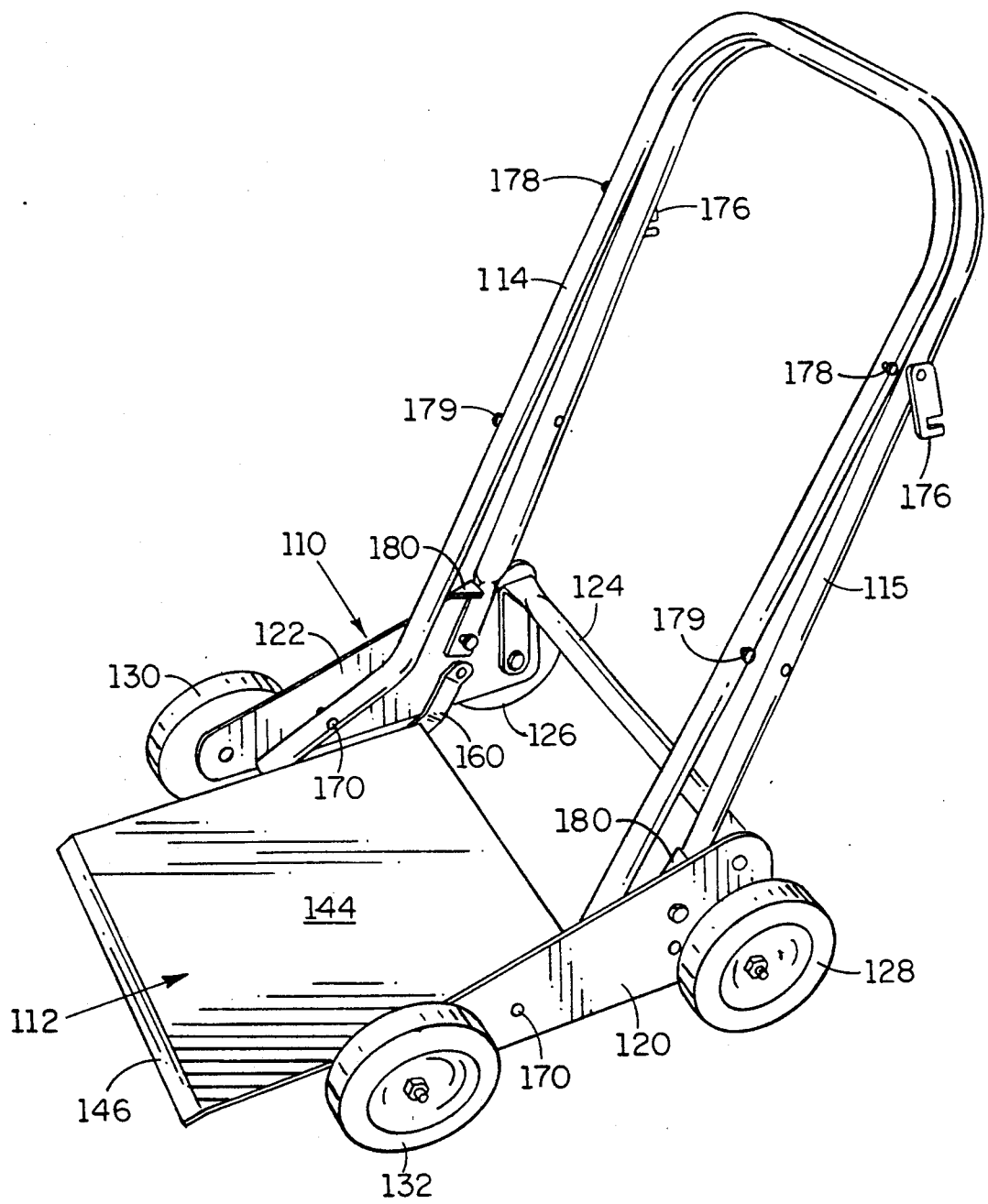
FIG. 6 is a perspective view of an alternative preferred embodiment of the present invention in a transport

Reference is now made to FIG. 6 for a brief description of a second alternative embodiment of the present invention. The vertical lift dolly in this second alternative preferred embodiment is comprised of four primary elements or assemblies just as the above described preferred embodiment. Wheeled carriage 110 provides a frame to which are attached load table 112 handle assemblies 114 and 115, and lift hinges 160. Wheeled carriage 110 again provides the structural frame for the vertical lifting of the action of the dolly in its horizontal transport action. Load table 112 again provides a surface upon which the load may be placed and moved. Load handle 114 serves the function of a lever arm by which the load may be lifted from the floor surface. Carriage handle 115 provides a means whereby the dolly may be controlled in its transportation once the load has been lifted onto load table 112, and provides a means for securing handle 114 when it is in a loaded position. Lift hinges 160 provide the means whereby load table 112 is maintained in a constant horizontal orientation, and provide support to the back end of load table 112.

Wheeled carriage 110 is generally a "U" shaped frame made up of three primary components. Left side carriage plate 120 is aligned parallel to right side carriage plate 122, and is connected to right side carriage plate 122 by way of carriage crossmember 124.

In this second alternative embodiment, wheeled carriage 110 is supported at its four corners by four independently functioning wheels. Right side rear wheel 126 and left side rear wheel 128 are attached to wheeled carriage 110 at the junctions between left side carriage plate 120 and carriage crossmember 124, and right side carriage plate 122 and carriage crossmember 124. Positioned forward at an open end of the "U" shaped wheeled carriage 110 are right and left side front wheels 130 and 132. Together the components of wheeled carriage 110, in conjunction with the four wheels 126, 128, 130, and 132, form a stable "U" shaped carriage design that surrounds load table 112, and thus the load placed upon it.

Load table 112 is a platform of generally rectangular configuration designed to fit within the confines of wheeled carriage 110. Load table 112 is made up primarily of load table tray 144 and has a forward edge angled down to form load table lip 146.

Load table 112 is pivotally attached to wheeled carriage 110 at a total of four points. Load table 112 is first pivotally attached to each end of load handle 114 at points approximately midway along each side of load table 112. Load handle 114 is then pivotally attached to wheeled carriage 110 just above load table 112 on each side thereof. Fulcrum bolts 170 provide the pivot points for load handle 114 to lift or lower load table 112.

Load table 112 is also supported at its back end by way of lift hinges 160. Lift hinges 160 comprise a pair of short hangers, which are pivotally attached to load table 112 on each side thereof at its back edge. Load hinges 160 then extend up to a point where they are pivotally attached to wheeled carriage 110 in a manner that allows load table 112 to freely move except by the influence of load handle 114.

Carriage handle is pivotally attached to wheeled carriage 110, and may be held in a non-pivoting position by catch tabs 180. Carriage handle 115 in this embodiment is comprised of tubular steel, which has a certain amount of spring to it when bent in the configuration shown in the figure. This spring allows carriage handle 115 to be momentarily compressed, and to be pivoted past catch tabs 180 so as to allow carriage handle 115 to fold forward when the vertical lift dolly is placed in a storage configuration.

When a load is placed on load table 112 and lifted in the same manner described with the previous embodiment, load handle 114 is drawn from a forward position over wheeled carriage 110, with load table 112 in contact with the ground or floor surface, to a rearward position proximate to carriage handle 115. Once in this loaded position, retention clips 176 on either side of carriage handle 115 may engage retention clip studs 178 located in appropriate positions on load handle 114. Retention clips 176 also serve to retain the vertical lift dolly in a storage configuration, and engage retention clip studs 179, which are appropriately placed to be proximate to retention clips 176 when load handle 114 and carriage handle 115 have been folded forward into a storage position.

Reference is now made to FIG. 7 for a third alternative embodiment of the present invention. The embodiment shown in FIG. 7 contains many of the same structural features as the previously described embodiments. Wheeled carriage 210 is made up of three structural components, left side carriage arm 220, right side carriage arm 222, and carriage crossmember 224. Wheeled carriage 210 likewise is supported at its four corners by four wheels, right side rear wheel 226, left side rear wheel 228, right side front wheel 230, and left side front wheel 232. Left and right side front wheels 230 and 232 are supported by rotating casters 231 and 233. Handle 214 in this embodiment serves the function of transporting the vertical lift dolly from one location to another, but does not per form the lever action function as in the previous embodiments.

In this third alternative embodiment, load lifting bar 250 acts as a lever arm to lift the load into a transport position. As with the previous embodiment, load table 112 is a substantially rectangular platform, and is comprised of load table tray 244, load table right side 248, load table left side (not shown), and load table lip 246.

Load table 212 is supported at four points, and as with the previous embodiments, maintains a substantially horizontal orientation throughout the lifting and lowering process. Near its front end, load table 212 is supported by left and right support hangers 240 and 242. Support hangers 240 and 242 are pivotally attached to the front ends of load table right side 248 and load table left side (not shown). Support hangers 240 and 242 are also pivotally attached to wheeled carriage 210 at right side carriage arm 222 and left side carriage arm 220.

Load table 212 is supported at its back edge by way of right side load table lifter 260 and left side load table lifter 262. Load table lifters 260 and 262 are triangular plates each with a first vertex pivotally attached to load table 212. A second vertex of each of right and left side load table lifters 260 and 262 is pivotally attached to wheeled carriage 210. The third vertex of each of load table lifters 260 and 262 is pivotally attached to right and left side fulcrum arms 270 and 271. Right and left side fulcrum arms 270 and 271 are themselves pivotally attached to wheeled carriage 210 at the same point as support hangers 240 and 242. Fulcrum arms 270 and 271 serve to rotate left and right side load table lifters 260 and 262 when influenced by the movement of right and left side pulling arms 264 and 266. Right and left side pulling arms 264 and 266 are pivotally attached to and controlled by load lifting bar 250. The lifting and lowering operation of the embodiment shown with FIG. 7 is described in more detail in FIG. 8 below.

FIG. 8 is a side view showing the lever arrangements that lift and lower load table 212 in the third alternative embodiment shown in FIG. 7. In FIG. 8, load table 212 is shown both in its lowered configurations (solid lines), and in its raised configuration (shadow lines). Right side carriage arm 222 is shown stationary in both configurations. Attached to right side carriage arm 222 is lifter bar bracket 236. Load bar bracket 236 pivotally engages load lifting bar 250, and allows it to be raised and lowered with respect to right side carriage arm 222 while pivoting at bracket 236. When load lifting bar 250 is raised to the position shown in FIG. 8, pulling arm 264 draws fulcrum arm 270 into a raised, nearly horizontal position This rotates right side load table lifter 260 into a position that lowers the rear end of load table 212. This position is followed by the front end of load table 212 by way of load hanger 242.

When load lifting bar 250 is pushed downward pulling arm 264 directs fulcrum arm 270 to a downward position, which rotates right side load table lifter 260 in a clockwise direction, which in turn lifts load table 212 to a raised position. Once again, hanger 242 allows the front end of load table 212 to follow the position of the rear end of load table 212, which is under the control of load table lifter 260. Referring back to FIG. 7, load lifter 250 may be forced downward by the foot of the operator of the vertical lift dolly of this third alternative embodiment. This downward motion at the rear end of the vertical lift dolly translates into an upward motion of load table 212 by way of the rotation of load table lifters 260 and 262.

The transport, loading, and unloading of each of these alternative preferred embodiments is essentially the same as the method described in relation to the preferred embodiment.

While the invention has been described in connection with a preferred embodiment and a number of alternative preferred embodiments, it is not intended to limit the invention to the particular forms or practices set forth, but, on the contrary, it is intended to cover such further alternatives. modifications, and equivalences as may be included within the spirit and scope of the invention and the claims.

I claim:

1. A vertical lift dolly for manually lifting and transporting a load, comprising:
    a wheeled carriage, said wheeled carriage comprising a left side arm, a right side arm, a plurality of wheels secured to said side arms, a crossmember connecting said left side arm to said right side arm, and a first and a second load support pin, said first load support pin positioned on said left side arm and said second load support pin positioned on said right side arm;
    a load platform positioned adjacent said wheeled carriage and being partially surrounded by said wheeled carriage, said load platform being vertically and horizontally movable and slidingly connected to said wheeled carriage at a first side of said load platform to said first load support pin and at second side of said load platform to said second load support pin, for accepting and lifting objects thereon;

a first and a second lever means, each of said lever means comprising:
   a load arm, said load arm of said first lever means rigidly attached to said first side of said load platform, and said load arm of said second lever means rigidly attached to said second side of said load platform;
   a load arm lifter, said load arm lifter of said first lever means pivotally attached to said load arm of said first lever means, and said load arm lifter of said second lever means pivotally attached to said load arm of said second lever means; and a handle pivotally attached to said wheeled carriage and rigidly attached to said first and said second lever means at said load arm lifters, such that rotation of said handle with respect to said wheeled carriage lifts and draws back or lowers and direct forward said lever means and thereby acts to raise or lower said load platform.

2. The vertical lift dolly of claim 1 wherein said plurality of wheels number four, said left side arm of said wheeled carriage retains a first of said wheels on a forward end thereof and a second of said wheels on a back end thereof, and said right side arm of said wheeled carriage retains a third of said wheels on a forward end thereof and a fourth of said wheels on a back end thereof and said first and third of said wheels on said forward ends of said side arms are attached to said side arms through rotating casters.

3. The vertical lift dolly of claim 1 wherein said fulcrum hinge means comprises:
   a fulcrum member rigidly connected to said handle and pivotally connected to said wheeled carriage; and
   a lift member rigidly connected to said load platform and pivotally connected to said fulcrum member;
   whereby said rotation of said handle with respect to said wheeled carriage rotates said fulcrum member and thereby vertically and horizontally moves said lift member, which thereby vertically and horizontally moves said load platform.

4. The vertical lift dolly of claim 1 further comprising means for retaining said load platform in a stationary, raised position with respect to said wheeled carriage, said stationary, raised position being suitable for said transport of said load, said means for retaining said load platform comprising a retaining hook, said retaining hook pivotally attached to said wheeled carriage at said crossmember and positioned so as to engage and disengage a rear edge of said load platform upon rotation of said retaining hook.

5. The vertical lift dolly of claim 1 wherein said load platform sides define slots within which said load support pins slid, said slots being configured to guide said load platform to be raised or lowered without significantly disturbing a general horizontal orientation of said load platform thereby permitting vertical lifting and transport of said load without disturbing a stable orientation of said load.

6. A vertical lift dolly for manually lifting and transporting a load, comprising:
   a wheeled carriage, said wheeled carriage comprising:
      a left side arm,
      a right side arm,
      four wheels secured to said side arms, said left side arm of said wheeled carriage retaining a first of said wheels on a forward end thereof and a second of said wheels on a back end thereof, and said right side arm of said wheeled carriage retains a third of said wheels on a forward end thereof and a fourth of said wheels on a back end thereof, said first and third of said wheels on said forward ends of said side arms being attached to said side arms through rotating casters;
      a crossmember connecting said left side arm to said right side arm; and
      a first and second load support pin, said first load support pin positioned on said left side arm and said second load support pin positioned on said right side arm;
   a load platform positioned adjacent said wheeled carriage and being partially surrounded by said wheeled carriage, said load platform being vertically and horizontally movable and slidingly connected to said wheeled carriage at a first side of said load platform to said first load support pin and at a second side of said load platform to said second load support pin, for accepting and lifting objects thereon;
   a handle pivotally attached to said wheeled carriage and rigidly attached to said first and second lever means at said load arm lifters, such that rotation of said handle with respect to said wheeled carriage lifts and draws back or lowers and directs forward said lever means and thereby acts to raise or lower said load platform, said rotation of said handle towards said forward open end of said wheeled carriage acting to lower said load platform and to move said load platform forward and out from said wheeled carriage, and said rotation of said handle away from said forward open end of said wheeled carriage, and said rotation of said handle away from said forward open end of said wheeled carriage acting to raise said load platform and to move said load platform backward into said wheeled carriage, said load platform sides defining slots within which said load support pins slide, said slots being configured to guide said load platform to be raised or lowered without significantly disturbing a general horizontal orientation of said load platform thereby permitting vertical lifting and transport of said load without disturbing a stable orientation of said load;
   a first and a second lever means, each of said lever means comprising:
      a load arm, said load arm of said first lever means rigidly attached to said first side of said load platform, and said load arm of said second lever means rigidly attached to said second side of said load platform;
      a load arm lifter, said load arm lifter of said first lever means pivotally attached to said load arm of said first lever means, and said load arm lifter of said second lever means pivotally attached to said load arm of said second lever means; and
   means for retaining said load platform in a stationary, raised position with respect to said wheeled carriage, said stationary, raised position being suitable for the transport of said load, said means for retaining said load platform comprising a retaining hook pivotally attached to said wheeled carriage at said crossmember and positioned so as to engage and disengage a rear edge of said load platform upon rotation of said retaining hook.

* * * * *